United States Patent [19]
Gale et al.

[11] Patent Number: 4,914,397
[45] Date of Patent: Apr. 3, 1990

[54] DIGITAL FREQUENCY CONVERTER

[75] Inventors: Simon J. Gale, Bishop's Stortford; Stephen M. Moroz, Devon, both of Great Britain

[73] Assignee: STC PLC, London, United Kingdom

[21] Appl. No.: 227,017

[22] Filed: Aug. 1, 1988

[30] Foreign Application Priority Data

Oct. 10, 1987 [GB] United Kingdom ............... 8723856

[51] Int. Cl.$^4$ ............................................. H03B 19/00
[52] U.S. Cl. ........................................ 328/15; 328/27; 307/529
[58] Field of Search ............... 307/271, 480, 269, 529, 307/27; 328/15, 14, 63, 55, 155

[56] References Cited

U.S. PATENT DOCUMENTS

| | | | |
|---|---|---|---|
| 4,185,247 | 1/1980 | Harrision, Jr. ........................ | 328/165 |
| 4,365,203 | 12/1982 | DiMassimo et al. .................. | 328/63 |
| 4,443,767 | 4/1984 | Reichert et al. ..................... | 328/155 |
| 4,484,296 | 11/1984 | Treise et al. .......................... | 328/14 |
| 4,492,936 | 1/1985 | Albarello et al. ...................... | 328/14 |
| 4,636,734 | 1/1987 | Genrich ................................. | 328/55 |
| 4,758,737 | 7/1988 | Hirano ................................... | 307/269 |

Primary Examiner—Stanley D. Miller
Assistant Examiner—Terry Cunningham
Attorney, Agent, or Firm—Lee, Mann, Smith, McWilliams & Sweeney

[57] ABSTRACT

A digital frequency up conversion arrangement comprising a source of fixed high speed clock pulses the frequency of which is near to the desired output frequency of the converter arrangement, a high frequency counter to which the clock pulses are applied to produce a repetitive fixed m-bit digital word in parallel output form, the sample rate of the m-bit word being equal to the high speed clock frequency, divider to which the high speed clock pulses are applied to form a slow clock pulse train, a slow frequency NCO to which the slow clock train is applied together with frequency control signals to produce m-bit words the sample rate of which is equal to the slow clock frequency, summing means to which the high sample rate and slow sample rate m-bit words are applied to produce resultant m-bit words which form a digital representation of a sine wave at the required output frequency, and digital-to-analog conversion means to which the resultant m-bit words are applied to produce an analog sine wave at the required output frequency.

3 Claims, 4 Drawing Sheets 4,914,397

DIGITAL FREQUENCY CONVERTER

BACKGROUND OF THE INVENTION.

This invention relates to a digital frequency converter and finds application in, inter alia, the generation of high speed controllable clocks for use in code correlation arrangements in global positioning systems (GPS) equipments.

For many applications it is desirable to fabricate integrated circuits in current CMOS technology. However, for some circuits such as a multi-bit numerically controlled oscillator (NCO) it is difficult to use CMOS technology for clock frequencies in excess of 20 MHz.

The present invention provides a controllable digital frequency up-converter arrangement which can be made in CMOS and which is functionally the equivalent of an NCO running at a high frequency e.g. 20 MHz or more.

SUMMARY OF THE INVENTION.

According to the present invention a digital frequency up conversion arrangement comprising a source of fixed high speed clock pulses the frequency of which is near to the desired output frequency of the converter arrangement, a high frequency counter to which the clock pulses are applied to produce a repetitive fixed m-bit digital word in parallel output form, the sample rate of the m-bit word being equal to the high speed clock frequency, a source of slow clock pulses synchronized with the high speed clock pulse train, a slow frequency NCO to which the slow clock train is applied together with frequency control signals to produce m-bit words the sample rate of which is equal to the slow clock frequency, summing means to which the high rate and slow sample rate m-bit words are applied to produce resultant m-bit words which form a digital representation of a sine wave at the required output frequency, and digital-to-analog conversion means to which the resultant m-bit words are applied to produce an analog sine wave at the required output frequency. output frequency, and digital-to-analog conversion means to which the resultant m-bit words are applied to produce an analog sine wave at the required output frequency.

BRIEF DESCRIPTION OF THE DRAWINGS.

Embodiments of the invention will now be described with reference to the accompanying drawings, in which.

DESCRIPTION OF THE PREFERRED EMBODIMENTS.

Figure 1:
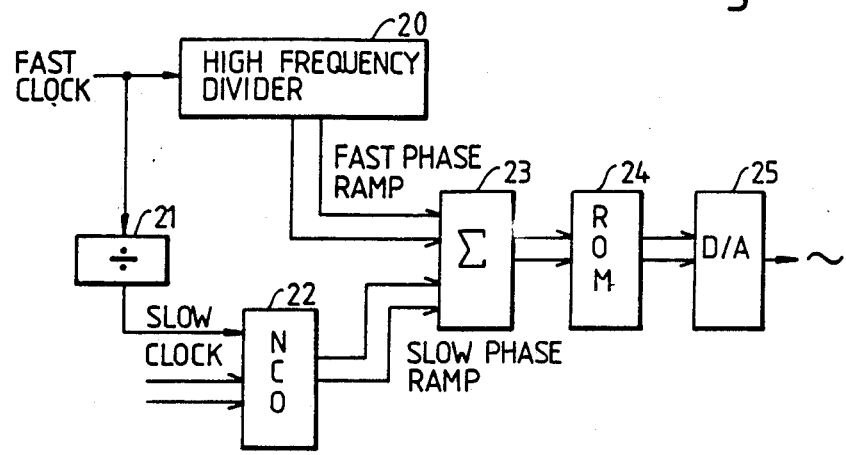
FIG. 1 illustrates a frequency up-conversion arrangement.
Figure 2:
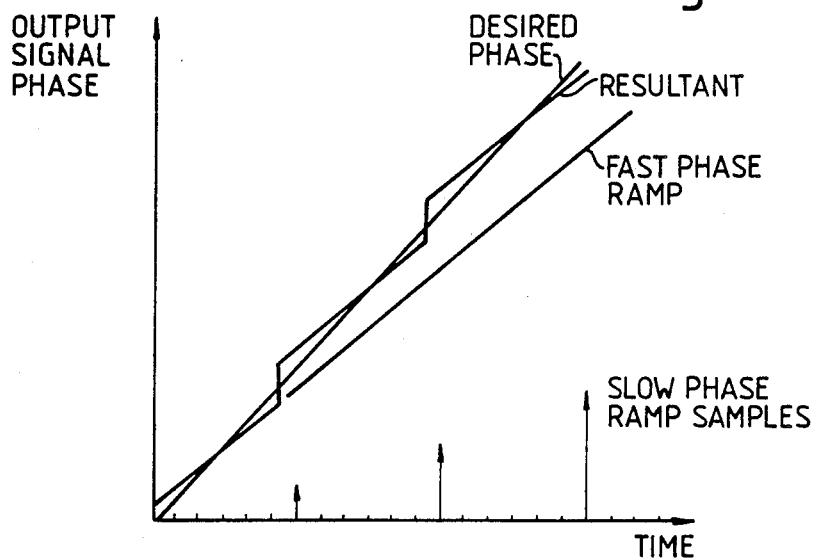
FIG. 2 illustrates phase trajectories associated with the arrangement of FIG. 1

The basic up-converter arrangement of FIG. 1 utilises a fast clock applied to a high frequency divider 20 near to the required output frequency. The divider 20 is implemented as a fast counter producing an m-bit word in parallel output form. The sample rate of this ramp is approximately equal to the required high frequency output. To achieve a fine control of the ramp frequency a slow, synchronous clock frequency is used to drive a slow running NCO 22. In practice the slow clock can be derived from the fast clock by a divider 21. The output of NCO 22, which is also a m-bit word, is added to the output of the divider 20 in a parallel adder 23. The resultant m-bit sum is used to address a ROM 24 which provides digital representation of a sine wave. This can be converted in a digital to analog converter 25 to an analog sine wave. The associated phase trajectories are illustrated in FIG. 2. It can then be seen that he resulting phase errors are a function of the slow NCO frequency and the time between phase corrections compared to the fast divider clock.

Figure 3:
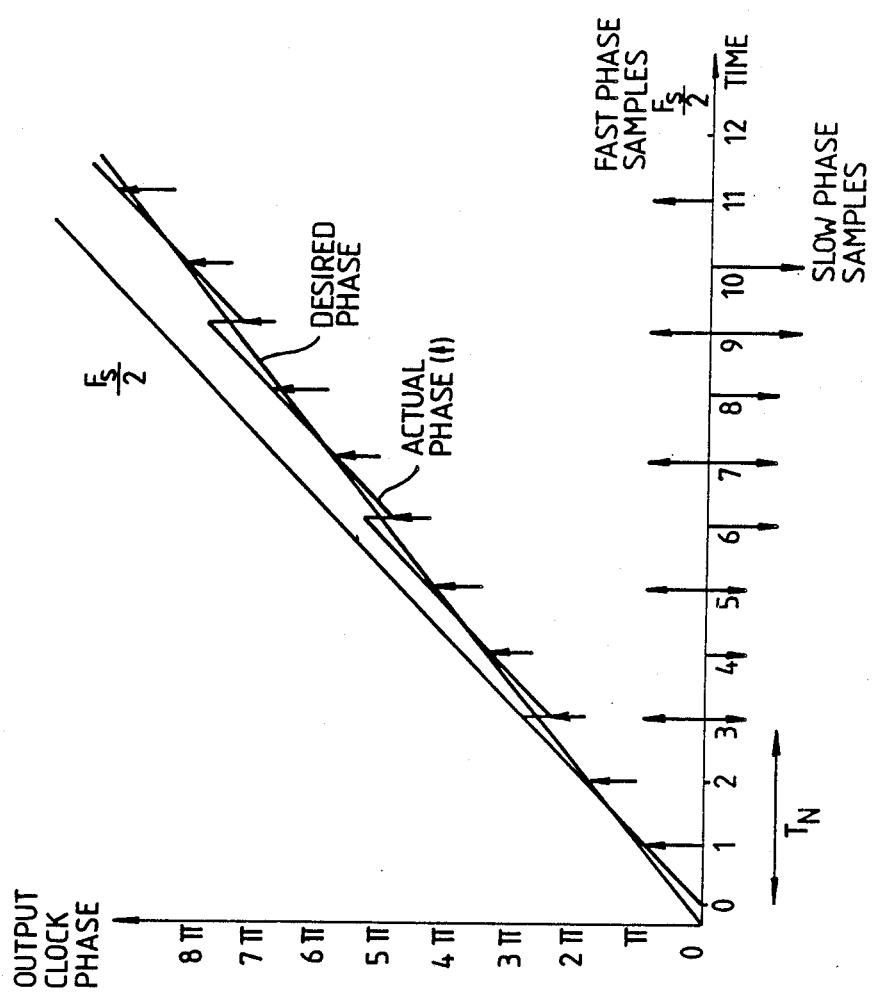
FIG. 3 illustrates phase trajectories for a modification of the arrangement of FIG. 1.

The technique may be used to generate a square wave clock by using some simplifications. The fast phase ramp may be generated by dividing the sample clock by 2. Alternate output samples of 0 or $\pi$ will thus result. This represents a phase ramp of half the sample frequency. The ramp must therefore be slowed by subtracting an NCO phase ramp output. The resulting phase trajectory is shown in FIG. 3. It can be seen that the maximum phase error is given by:

$$\phi_p = (F_S - F_{O\ min}) \times T_N \times 2\pi \text{ radians}$$

Where
$F_S$ = sample frequency
$F_O$ = minimum output frequency
$T_N$ = slow NCO update time.

A simplification to the above is that the required output clock waveform may be obtained by truncating the phase sum to 1-bit word and inverting. The addition may be performed simply by modulo two addition of the fast phase ramp to the most significant bit (MSB) of the output of the slow NCO. The resulting circuit is an exclusive OR gate followed by an inverter. The fast phase ramp may be generated by a D-type bistable connected to toggle. A possible circuit is shown in FIG. 4.

Figure 4:
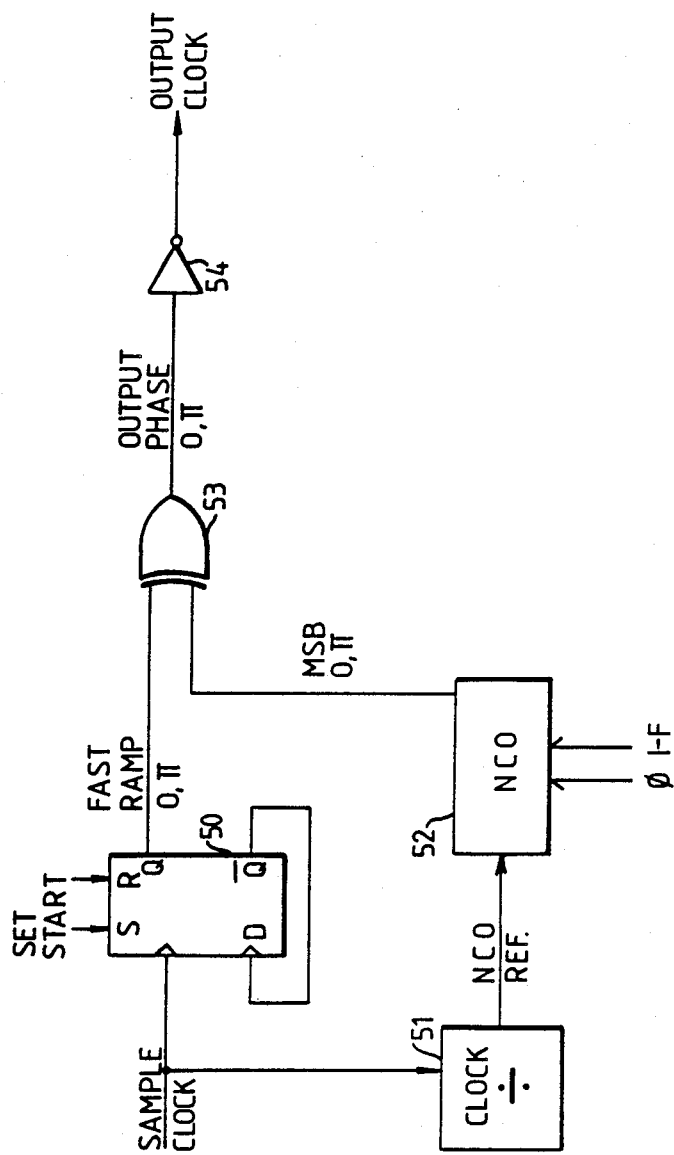
FIG. 4 illustrates a simplified up-conversion arrangement.
Figure 5:
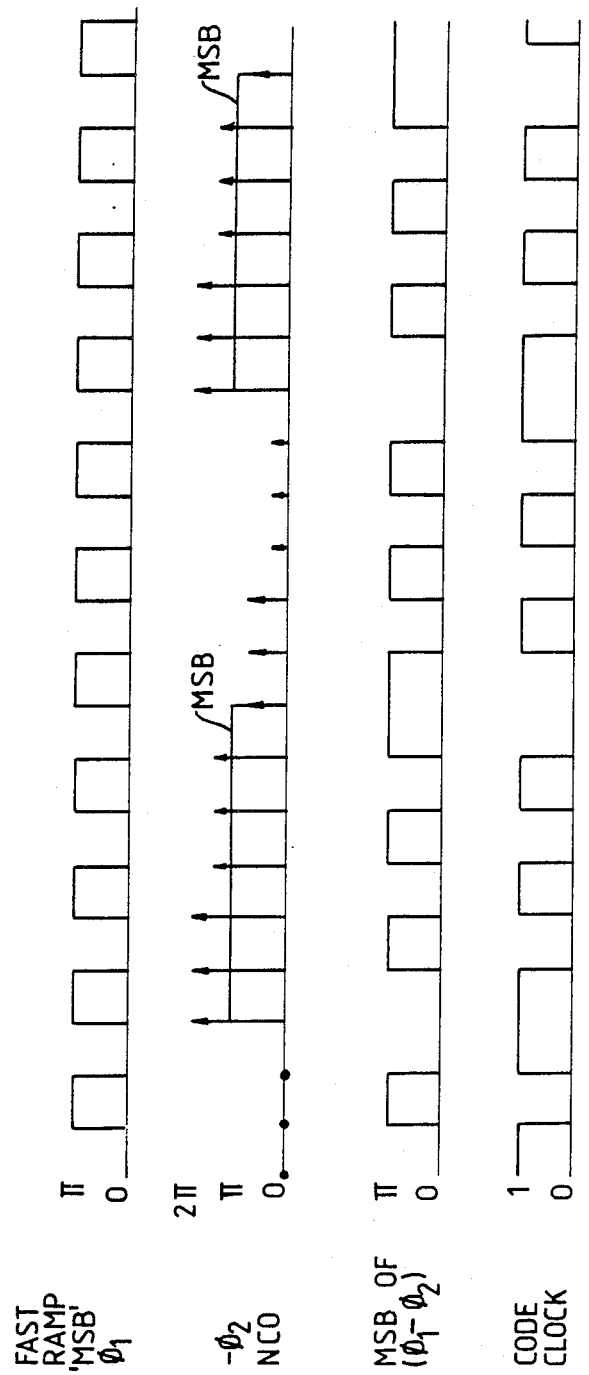
FIG. 5 illustrates waveforms associated with the arrangement of FIG. 4.

In the simplified arrangement of FIG. 4 the fast sample clock is fed to the D-type bistable 50 connected to function as a divide-by-two toggle. The fast clock is also fed to a divider 51 to produce a slow reference clock for the NCO 52. The output of bistable 50 is summed with the most significant bit (MSB) of the NCO output in exclusive-OR gate 53 which is followed by inverter 54. It is assumed that the NCO is supplied with negative frequency input data. It must also be noted that the output would in practice need to be reclocked to remove glitches. The resultant waveforms are shown in FIG. 5. It can be seen that the clock is delayed by one sample each time the NCO phase passes n$\pi$.

We claim:
1. A digital frequency up conversion arrangement comprising
    a first source of fixed high speed clock pulses the frequency of which is near to the desired output frequency of the converter arrangement,
    a high frequency divider to which the output of said first source is applied to produce a repetitive fixed first digital word, the sample rate of the digital word being equal to the high speed clock frequency,
    a second source of slow clock pulses synchronised with the high speed clock pulses, a slow frequency numerically controlled oscillator (NCO) to which the output of said second source is applied together with negative frequency input data to produce second digital words the sample rate of which is equal to the slow clock frequency, summing means to which the digital word outputs of the high frequency divider and the slow frequency NCO are applied to produce resultant digital words which form a digital representation of a sine wave at the desired output frequency of the converter arrangement, and digital-to-analog conversion means to which the output of the summing means is applied to produce an analog sine wave at the desired output frequency.

2. An arrangement according to claim 1 wherein said high frequency divider comprises a D-type bistable connected as a divide-by-two-counter and said summing means comprises an exclusive-OR gate to one input of which the output of the bistable is applied and to the other input of which is applied the most significant bit (MSB) of the output of the numerically controlled oscillator (NCO).

3. An arrangement according to claim 1 wherein the source of slow clock pulses comprises a divider to which the high speed clock pulses are applied.

* * * * *